United States Patent
Kuehn et al.

(10) Patent No.: US 7,451,884 B2
(45) Date of Patent: Nov. 18, 2008

(54) CONTAINER PROVIDED WITH A PRESSURE EQUALIZATION OPENING

(75) Inventors: Torsten Kuehn, Ingelheim (DE); Burkhard Peter Metzger, Ingelheim (DE)

(73) Assignee: Boehringer Ingelheim Pharma KG, Ingelheim (DE)

( * ) Notice: Subject to any disclaimer, the term of this patent is extended or adjusted under 35 U.S.C. 154(b) by 120 days.

(21) Appl. No.: 11/099,196

(22) Filed: Apr. 5, 2005

(65) Prior Publication Data

US 2005/0167433 A1 Aug. 4, 2005

Related U.S. Application Data

(60) Continuation of application No. 10/215,610, filed on Aug. 9, 2002, now abandoned, which is a division of application No. 09/828,109, filed on Apr. 6, 2001, now Pat. No. 6,503,440.

(60) Provisional application No. 60/220,835, filed on Jul. 26, 2000.

(30) Foreign Application Priority Data

Apr. 7, 2000 (DE) .............................. 100 17 443

(51) Int. Cl.
*B65D 23/08* (2006.01)
*B65D 25/14* (2006.01)

(52) U.S. Cl. ............... 215/12.2; 215/12.1; 215/902; 220/62.21; 220/745; 220/915; 222/263

(58) Field of Classification Search ............... 215/12.2, 215/902, 12.1; 220/62.21, 661, 745, 915; 222/107, 263

See application file for complete search history.

(56) References Cited

U.S. PATENT DOCUMENTS

| | | | | |
|---|---|---|---|---|
| 2,743,038 | A | * | 4/1956 | Ferries ........................ 222/95 |
| 4,008,830 | A | * | 2/1977 | Meshberg .................... 222/95 |
| 4,657,151 | A | * | 4/1987 | Cabernoch ................. 215/11.6 |
| 4,979,631 | A | * | 12/1990 | Krishnaukumar et al. .. 215/12.2 |

(Continued)

FOREIGN PATENT DOCUMENTS

EP 0812094 A * 5/1986

*Primary Examiner*—Sue A Weaver
(74) *Attorney, Agent, or Firm*—Michael P. Morris; Mary Ellen M. Devlin; Timothy X. Witkowski

(57) ABSTRACT

A process for the production of a container (1) comprising an outer container (2), an inner bag (3) disposed therein and a pressure equalisation opening (10) disposed in the outer container (2), and also a container (1) produced according to this process, is described, wherein firstly a pre-moulding, comprising two coaxial tubes, is first produced by co-extrusion with the help of a blow mould and with an outwardly-projecting base seam (5) being formed. The process is to form a pressure equalisation opening (10) in the outer container (2) of the container (1) without endangering the integrity of the container (1), wherein a lower wastage rate and higher productivity are to be achieved. This is attained by a process wherein the base seam (5) is partially cut off and a force which acts in the direction of the seam is introduced into the pre-moulding, which still has a temperature of 40° C. to 70° C., which force breaks open and plastically deforms the base seam (5) so that a pressure equalisation opening (10) is formed in the base area (4).

11 Claims, 4 Drawing Sheets

U.S. PATENT DOCUMENTS

| | | | |
|---|---|---|---|
| 5,301,838 A * | 4/1994 | Schmidt et al. | 222/95 |
| 5,435,452 A * | 7/1995 | Nishigami et al. | 215/12.1 |
| 5,513,761 A * | 5/1996 | Kobayashi et al. | 215/12.1 |
| 5,799,809 A * | 9/1998 | Sako et al. | 215/12.1 |
| 5,921,416 A * | 7/1999 | Uehara | 215/12.1 |
| 6,083,450 A * | 7/2000 | Safian | 264/515 |
| 6,109,468 A * | 8/2000 | Kneer | 215/378 |
| 6,266,943 B1 * | 7/2001 | Nomoto et al. | 53/410 |

* cited by examiner

CONTAINER PROVIDED WITH A PRESSURE EQUALIZATION OPENING

RELATED APPLICATIONS

This application is a continuation of U.S. application Ser. No. 10/215,610, filed Aug. 9, 2002, now abandoned which is a divisional under 35 U.S.C. § 121 of U.S. application Ser. No. 09/828,109, filed Apr. 6, 2001, now U.S. Pat. No. 6,503, 440 which claimed benefit under 35 U.S.C. § 119(e) of prior U.S. provisional application Ser. No. 60/220,835, filed Jul. 26, 2000. U.S. application Ser. No. 09/828,109 and U.S. provisional application Ser. No. 60/220,835 are each hereby incorporated by reference herein in their entireties.

DESCRIPTION OF THE INVENTIONS

The invention relates to a process for the production of a container provided with a container opening, having a substantially rigid outer container and an inner bag disposed therein which is in contact with the later container contents, these respectively comprising different thermoplastic plastics which are not bonded to each other, and a pressure equalisation opening, disposed in the outer container, which equalises a pressure difference between the outer container and the inner bag, wherein a preliminary moulding, comprising two coaxial tubes which have a sufficient length for manufacture of the container, is first produced by co-extrusion between the opened halves of the blow mould, the blow mould is closed and with that an outwardly-projecting base seam is formed, the excess material in the base area of the container that is to be manufactured being squashed out in such a way that the material of the outer container which is in contact in the area of the seam is welded together, the tube which forms the inner bag is clamped, axially fixed and welded between the wall sections of the outer container and the inner bag is subjected to pressure so that the walls of the preliminary moulding lie against the contours of the blow mould from inside.

Furthermore, the invention relates to a container, preferably produced according to the process, with a container opening, substantially comprising a rigid outer container and an inner bag disposed therein, which is in contact with the later container contents.

A process of the type considered here is disclosed in WO 99/11451. The characterising feature of this process is that the pressure equalisation opening, via which the pressure difference existing between the outer container and the inner bag is equalised, is preferably configured as a lenticular or ellipsoid hole in the outer container, wherein this hole comes into being after completion of the actual forming process by cutting away a wall section of the outer container with the help of a cutting tool.

This means that the outer wall, against which the very thin flexible inner bag lies, must be completely cut away in at least one very small area without causing any damage to the inner bag. Processing of the outer container implies an indispensable contact between the cutting tool and the inner bag. The substantially most important quality features of the process and of the container manufactured according to the process cannot be realised simultaneously to an equal degree. They diverge in the present process, or container. On the one hand it must be possible to effect pressure equalisation between the outer container and the inner bag, which is necessary due to the volume reduction in the inner bag associated with the dispensing of the container contents. On the other hand, the container must be completely sealed, i.e. damage to the inner bag must be avoided at all costs, otherwise the container would be unusable. The difficulty of fulfilling both tasks satisfactorily is discussed in WO 99/11451. For example, it is stated that due to the wall strength tolerances of the outer container which occur as a result of its fabrication, wherein the wall thickness can vary between 1 and 1.5 mm, in price the depth of cut must be set so that it is guaranteed that a hole which actually penetrates the outer container results from the cutting process. Damage to the inner bag cannot be ruled out in every case. For this reason, preferred process steps and tools which are to be used in order to minimise the danger of damage to the inner bag are described in WO 99/11451.

A further disadvantage of the disclosed process is that the configuration of the pressure equalisation opening does not take place immediately after the forming process. The process step of cutting cannot take place on the plastic blowing machine, and especially not when the blowing mould is closed. The additional processing machine, or its tools, which are required for the suggested cutting process and the working steps which have been made necessary lead to an increase in costs and a reduction in productivity.

Furthermore, it can be desirable to connect a pump or an atomiser to the container opening of the container of the considered type, via which the material in the inner bag of the container is charged or removed. Depending on the configuration of the utilised pump or atomiser, the pressure equalisation opening can be partially or completely closed by the suitable pump or atomiser. In other words, it is not possible to attach any adaptor to the container in question, rather the particular position of the pressure equalisation opening of the respective embodiment example must be taken into consideration. Especially unfavourable positions for the wall opening are, in this case, positions in the shoulder area and in the area of the container jacket surface. The most suitable position for the wall opening, the container base, is expressly not mentioned.

SUMMARY OF THE INVENTION

On this basis, the object of the invention at issue is to introduce a process via which a pressure equalisation opening disposed in the outer container of a container of the type in question can be configured without endangering the integrity of the container, wherein the process should only have a minimum of process steps and should cost less than the process utilised according to the prior art whilst at the same time allowing a lower wastage rate and higher productivity.

Furthermore, a container should be introduced which has a pressure equalisation opening in its outer container without its inner bag being damaged during cutting of this opening, and which has no other disadvantages.

The process object is solved by the process according to the invention, where on closing the blow mould and hence forming the base seam, the seam of the inner bag is at least partially fixed axially in the seam of the outer container and at least one pressure equalisation opening is formed in that the base seam is at least partially but preferably not completely cut off after shaping, so that at least a partial area of the seam of the inner bag remains fixed in the seam of the outer container, and following this a radial force, acting in the direction of the seam, is introduced into the base area in such a way that the base seam breaks up, wherein the temperature of the pre-moulding is between 40° C. and 70° C. on cutting off the base seam and the outer container is still plastically deformable to some degree so that a permanent deformation results from the force which is not neutralised by elastic restoration.

The walls of the outer container and inner bag, which comprise different thermoplastic plastics, do not generally become welded together. As a result of the force exerted during squeezing out of the excess material through the blow mould halves, on the one hand the walls of the inner bag and on the other hand the walls of the outer container are welded together in each case. In addition, adhesion occurs in areas of the base seam between the walls of the inner bag and the outer container. This is a substantial advantage of the process with regard to fixing the inner bag in the base area. Here, the adhesion is such that when the base seam of the outer container is broken off, one of the two seam sides remains attached to the seam of the inner bag whilst the other seam side of the outer container does not remain fixed to the inner bag. In this way, axial fixing of the inner container is guaranteed despite this breaking off, even in embodiments where the seam of the outer container is broken off over its entire length. Fixing of the inner bag is of special significance in application cases where a canula is inserted into the container and detachment of the inner bag from the base area could lead to damage or blockage of the canula. Damage to the inner bag is excluded in the process according to the invention, since the seam is only partially cut off and hence the inner bag is firmly closed even after implementation of the cutting process by the remaining inner bag weld seam. In contrast to the process according to the prior art, the configuration of the pressure equalisation opening is not produced directly by the cutting process but rather by application of the force and breaking off the seam. The wastage rate is minimised.

Variants of the process are advantageous wherein an axial force, exerted substantially parallel to the longitudinal axis of the container, is briefly introduced after at least partially breaking off the base seam and before introduction of the radial force so that the base seam at least partially breaks open.

The axially-introduced force primarily serves to break open the base seam whilst the effect, or the purpose, of the radially-introduced force can be seen as the permanent deformation of the base seam. In spite of this, both forces are involved in both the deformation of the container, especially the base area, and the breaking-open process, wherein at one point the breaking-open process and at another point the deformation have precedence.

Processes are preferred which are characterised in that the axial force is introduced in the form of a blow.

Process variants are favourable wherein the production of the container takes place without the formation of a shoulder seam in the form of a squeeze seam.

This process is preferably carried out so that when the base seam is broken off, the material which forms the inner bag remains stuck, on one side of the base seam, to the outer container and the ends of the base seam, whereupon an axial fixing is maintained. In this case, the pressure equalisation opening between the inner bag and the outer container is disposed on the opposite side of the base seam.

A process is favourable where the base seam of the outer container is only partially broken off and the seam of the inner bag is fixed by the part of the base seam of the outer container which is not broken off.

In a preferred process, the base seam is cut off and the force which opens the outer container and permanently deforms it is exerted in one working step. This can be translated as meaning that a cutting tool and a tool for breaking off the seam work together and almost simultaneously in one working step. A very effective process variant provides that cutting off the base scam and application of the force which opens and permanently deforms the outer container is not only realised in one working step but also by one tool, in this case the cutting tool.

It is expedient that the base seam is cut off and the force which opens and permanently deforms the outer container take place in separate, closely-sequential work steps. The size of the container which is to be produced can be a deciding factor for the one or the other variant.

A process variant is recommended where the action of cutting off the base seam and application of the force which opens and permanently deforms the outer container takes place in the plastic blowing machine, especially when the container is still disposed within the closed blow mould. The container, which is 40 to 70° C. warm during the cutting process, is stabilised in this way. A basic advantage is the minimisation of processing machines and apparatus and the removal of additional work steps in this way, costs are reduced and productivity increased.

However, in individual cases it can again be expedient if cutting off the base seam and application of the force which opens and permanently deforms the outer container occurs on a machine which is attached to the plastic blowing machine. This also fills within the framework of the invention.

In most cases it is a process wherein the container is configured to be bottle-shaped and the inner bag is fixed in the area of the bottle neck in addition to being fixed in the area of the base. Here, processes wherein the inner bag is at least partially clamped in the wall of the outer container on formation of the bottle neck are especially favourable. This can easily be realised during the course of the process. If the diameter of the pre-moulding in the area of the future bottle neck is greater than the corresponding diameter of the blow mould, the excess material is squeezed out when the blow mould is closed and a weld seam results on the inner bag or the inner bag is fixed to the outer container.

The process can be arranged, using the corresponding blow mould, so that the bottle neck is configured with a projection protruding outwards in the radial direction on its face side. This can be necessary if the container is to be provided in a later process with a pump or an atomiser, which is preferably attached to the bottle neck.

In this case, the inner bag can be connected with the outer container by means of a part of an upright or horizontal fold, thus attaining additional fixing.

Process variants are preferred where the projection is exclusively formed from material of the outer container.

In correspondence with the described process, at least one pressure equalisation opening is provided in the base area with the container according to the invention, resulting from cutting off, breaking off and deformation of the base seam, wherein one side of the base seam the inner bag remains adhered to the container and the ends of the base seam, and is thus axially fixed.

Advantageous embodiments of the container state that the container is bottle-shaped and that the bottle neck has a projection extending outwards in the radial direction on its face side which can be necessary for the adaptation of a pump of an atomiser. However, the additional fixing in the area of the bottle neck and its embodiments are a part of the invention. As is the feature wherein the projection is exclusively formed from material of the outer container.

BRIEF DESCRIPTION OF THE DRAWINGS

The invention is explained in greater detain in the following text with reference to various drawing figures. The following are shown.

DETAILED DESCRIPTION OF THE INVENTION

Figure 1:
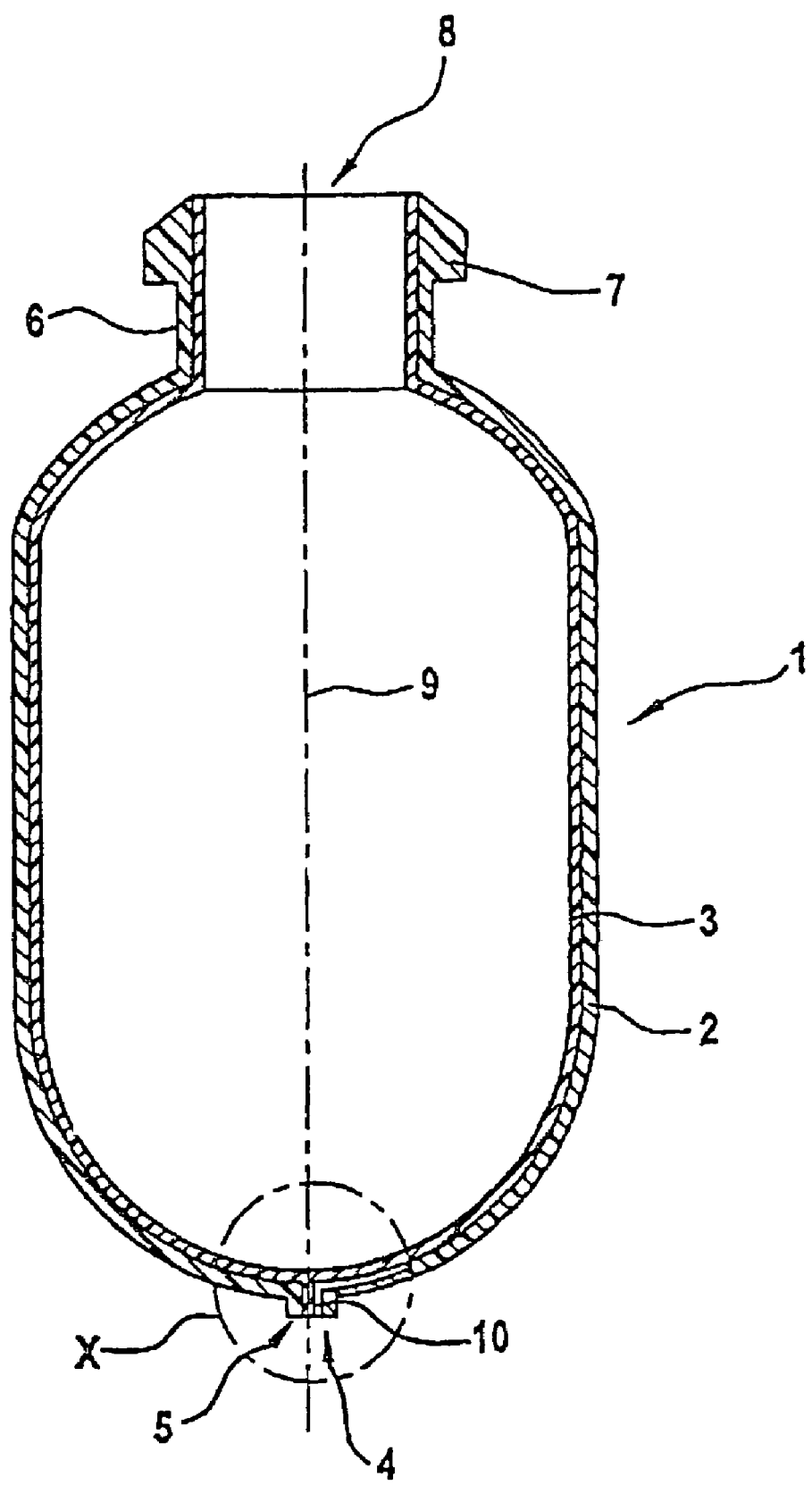
FIG. 1 cross-section in the direction of the container central axis through a first embodiment example of the container, FIG. 2 cross-section in the direction of the container central axis through the bottle neck of a second embodiment example of the container, FIG. 3 cross-section in the direction of the container central axis through the base area before the cutting process step, FIG. 4 cross-section in the direction of the container central axis through the base area after the cutting process step, FIG. 5 elevation of the container base in the direction of the container central axis, FIG. 6 elevation of the container base in the direction of the container central axis, after the breaking off and deformation process steps, and FIG. 7 cross-section in the direction of container central axis through the base area after the breaking off and deformation process steps. (detail X from FIG. 1).

In the following text, identical items axe referred to by the same reference characters.

FIG. 1 shows a cross-section through an embodiment example of the container 1 in the direction of the container central axis 9. The container, comprising an outer container 2 and an inner bag 3, is bottle-shaped in the present embodiment example. It has a projection 7 on its bottle neck 6 which is disposed on the end of the bottle neck 6 where the container opening 8 is located. The base seam 5 is disposed in the extension of the container central axis 9 in the base area 4 of the container 1, about the pressure equalisation opening 10 which belongs thereto. It is clearly shown that the projection 7 is formed from material of the outer container 2.

Figure 2:
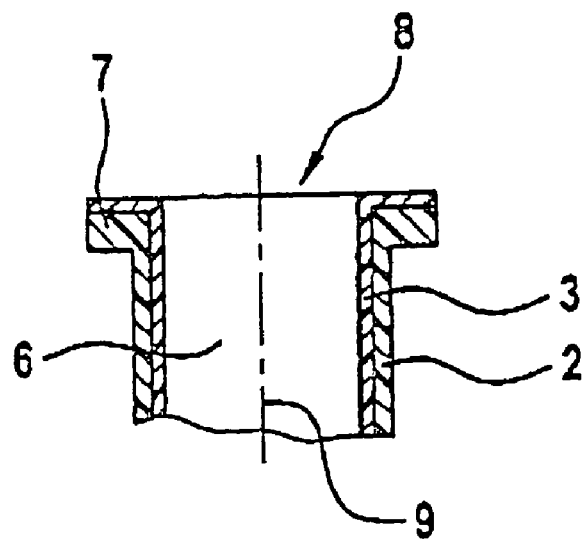

FIG. 2 shows a cross-section in the direction of the container central axis 9 through the bottle neck 6 of a second embodiment example of the container. The bottle neck 6 has a rectangular projection 7 on its face side directed towards the container opening 8. In contrast to the embodiment example shown in FIG. 1, the rectangular projection 7 has the special feature that it is formed from both the material of the outer container 2 and the inner bag 3, so that in addition to its fixing in the area of the base, the inner bag 3 is especially fixed in the area of the bottle neck 6.

Figure 3:
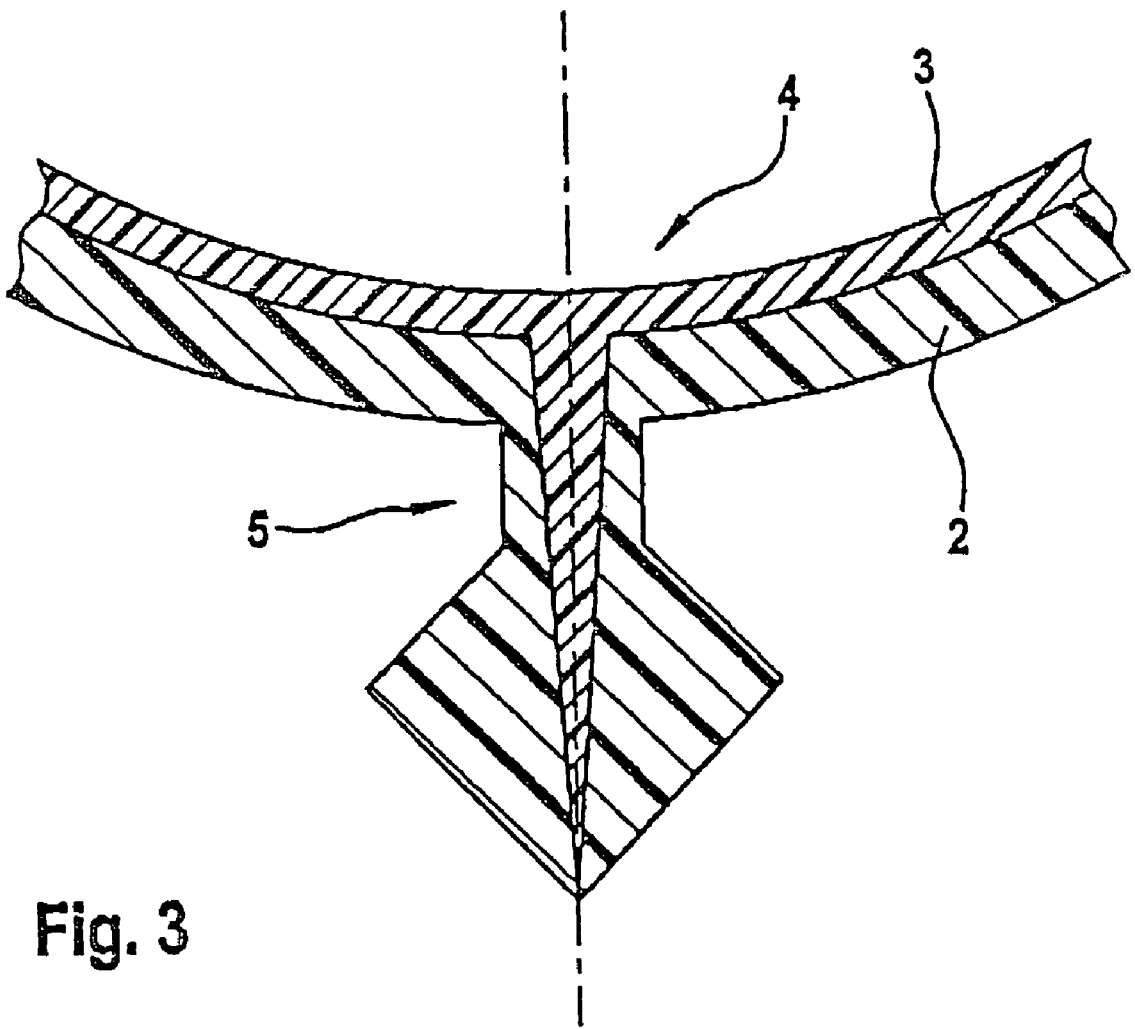

FIG. 3 shows a cross-section through the base area 4 and the base seam 5 disposed here after the blowing process but before the cutting process. The base seam 5, which results from squashing the excess material with the help of the two blow mould halves, has the shape of a dragon's tail after the actual forming process. The inner bag 3 is clamped between the walls of the outer container 2 in the area of the base seam 5.

Figure 4:
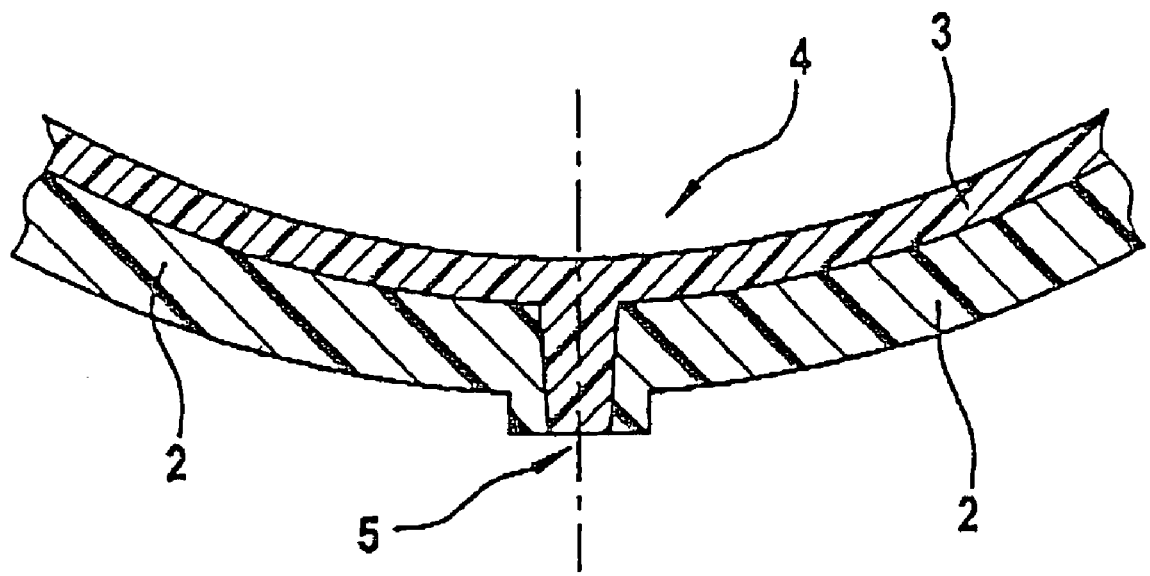

FIG. 4 shows a cross-section through the base area 4 and the base seam 5 disposed here after carrying out the cutting process in which the base seam 5 was partially cut off.

Figure 5:
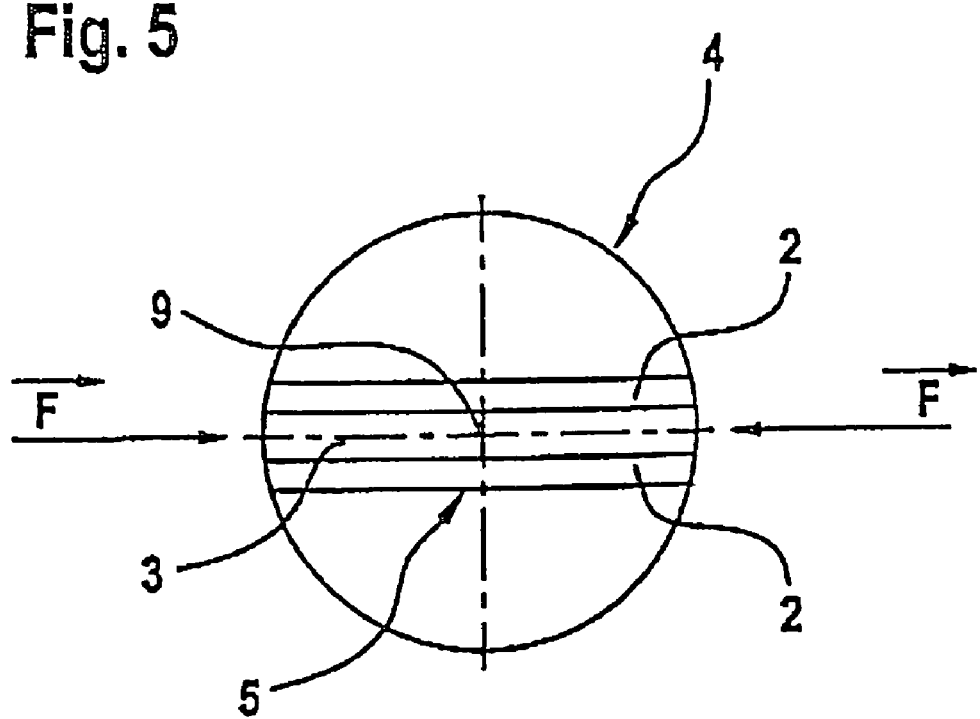

FIG. 5 shows an elevation of the base area with a view in the direction of the container central axis 9 after the base seam 5 has been partially cut off. The structure of the base seam 5 can be clearly seen, which is formed centrally by the walls of the inner bag 3 and is limited on both sides by the walls of the outer container 2. The radial forces F, which are exerted into the base area 4 in the direction of the seam to break open the base seam 5 and deform the outer container 2, are also shown. An axial force, which can optionally be introduced, is not shown or provided in the present embodiment example.

Figure 6:
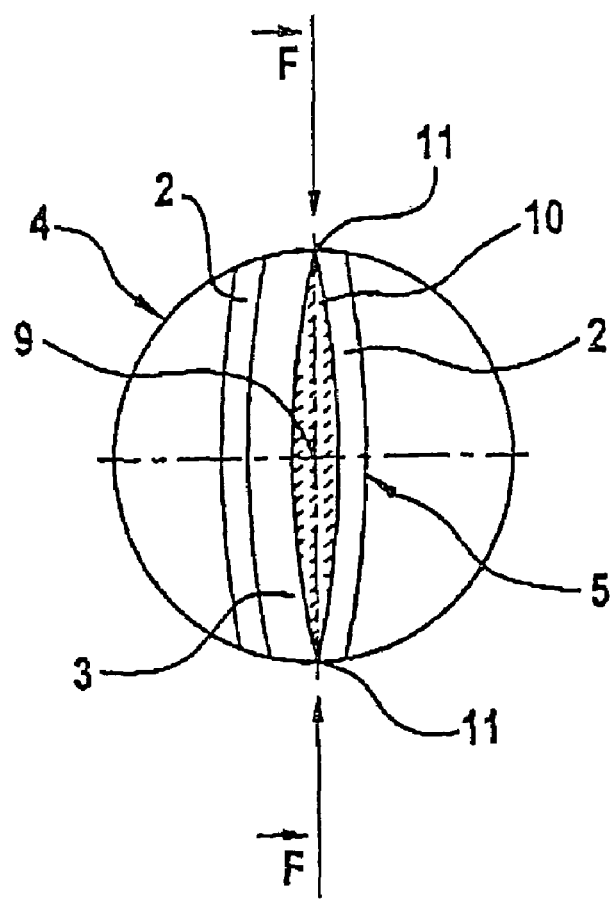

FIG. 6 shows an elevation of the base area 4 with a view in the direction of the container central axis 9 and the base seam 5 disposed in the base area 4, under the effect of the radial forces F which work in the direction of the seam. It is clearly shown how the container deforms and the base seam 5 breaks under the effect of the forces, forming a pressure equalisation opening 10. In this special embodiment example, on one side of the base seam 5 the inner bag 3 remains stuck to the outer container 2 and the ends of the base seam 11 and is thus axially fixed. The pressure equalisation opening 10, which is limited by the outer container 2 and the inner bag 3, is formed on the opposite side and can thus compensate for a pressure difference between the inner bag 3 and the outer container 2.

Figure 7:
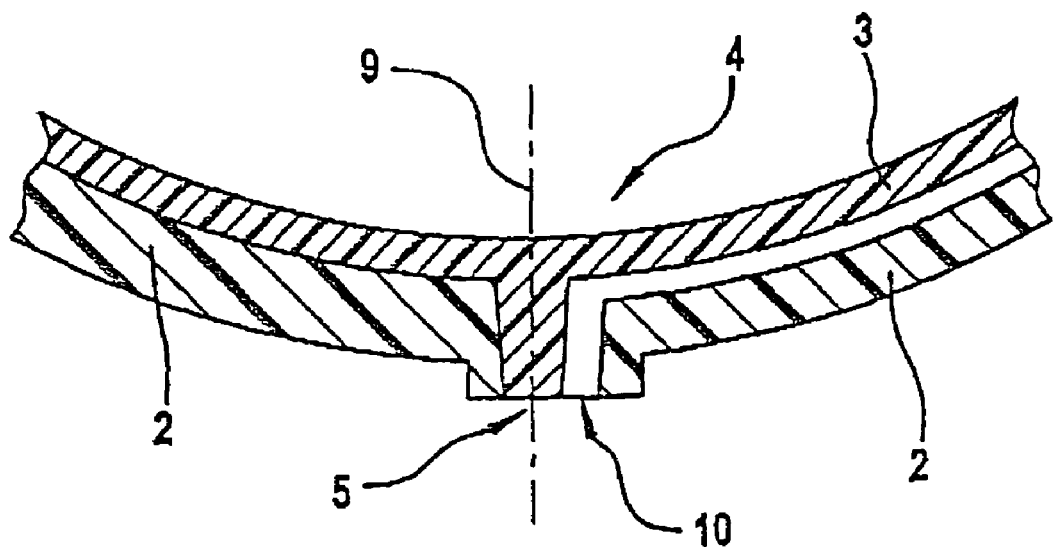

FIG. 7 shows a cross-section in the direction of the container central axis 9 through the base area 4 and the base seam 5 disposed therein. The pressure equalisation opening 10 can clearly be seen between the inner bag 3 and the outer container 2.

REFERENCE CHARACTER LIST

1. Container
2. Outer container
3. Inner bag
4. Base area
5. Base seam
6. Bottle neck
7. Projection
8. Container opening
9. Container central axis
10. Pressure equalisation opening
11. Ends of the base seam

The invention claimed is:

1. A container having a container opening, the container comprising:
   (a) a substantially rigid outer container having a pressure equalization opening located in and/or near a seam in a base area thereof; and
   (b) an inner bag disposed in the outer container and at least partially fixed axially in the seam of the outer container, wherein the outer container and inner bag respectively comprise different thermoplastic plastics not bonded to each other.

2. The container according to claim 1, wherein the container is configured in the shape of a bottle having a bottle neck with a face side.

3. The container according to claim 2, wherein the bottle neck is configured with a projection on its face side extending outwards in the radial direction.

4. The container according to claim 3, wherein the projection is made only from the thermoplastic of the outer container.

5. The container according to claim 3, wherein the projection is made from both the thermoplastic of the outer container and the thermoplastic of the inner bag.

6. The container according to claim 3, wherein the inner bag is connected with the outer container by means of an upright or horizontal fold in the area of the projection.

7. The container according to claim 2, wherein the inner bag is fixed in the area of the bottle neck in addition to the fixing in the base area.

8. The container according to claim 7, wherein the bottle neck is configured with a projection on its face side extending outwards in the radial direction.

9. The container according to claim 8, wherein the projection is made only from the thermoplastic of the outer container.

10. The container according to claim 8, wherein the projection is made from both the thermoplastic of the outer container and the thermoplastic of the inner bag.

11. The container according to claim 8, wherein the inner bag is connected with the outer container by means of an upright or horizontal fold in the area of the projection.

* * * * *